May 19, 1925.  1,538,814

O. C. HOFF

SIFTING DEVICE

Filed March 29, 1924

Olaf C. Hoff
INVENTOR

BY *Victor J. Evans*
ATTORNEY

WITNESS:

Patented May 19, 1925.

1,538,814

UNITED STATES PATENT OFFICE.

OLAF C. HOFF, OF BROOKLYN, NEW YORK.

SIFTING DEVICE.

Application filed March 29, 1924. Serial No. 702,947.

*To all whom it may concern:*

Be it known that I, OLAF C. HOFF, a citizen of the United States, residing at Brooklyn, in the county of Kings and State of New York, have invented new and useful Improvements in Sifting Devices, of which the following is a specification.

This invention relates to sifting devices and has for its principal object the provision of a device which will not sag under a heavy load, such as when a quantity of sand or the like is deposited thereon, and which will not clog up as in the case when a screen is provided for sifting purposes.

Another object of the invention is to provide a sifting device which includes a plurality of equi-distantly spaced longitudinal rods, which rods may be easily removed and replaced should the same become damaged.

A further object of the invention is to provide a sifting device which is simple in construction, cheap of manufacture and highly efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
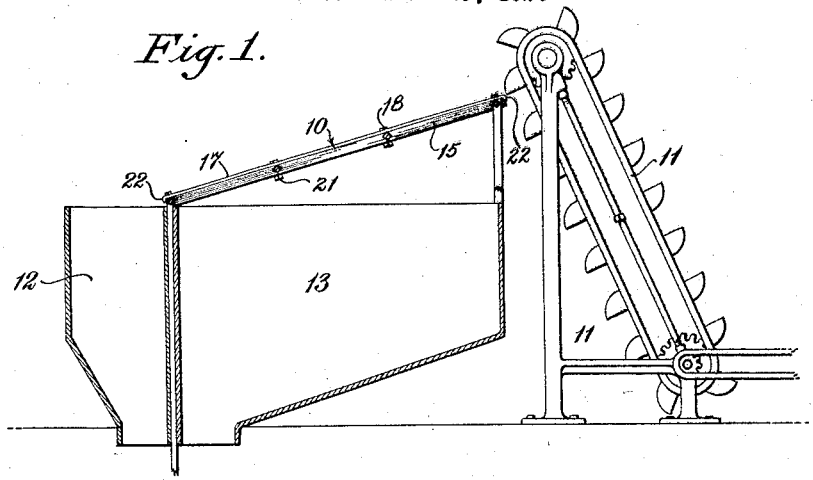
Figure 1 is a side elevation showing my invention in use.
Figure 2:
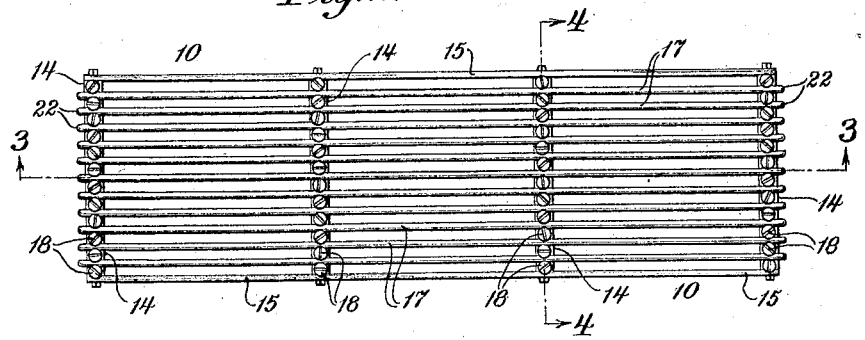
Figure 2 is a plan view of the invention per se.
Figure 3:
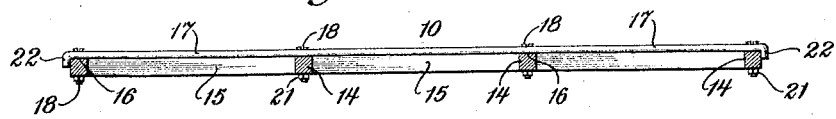
Figure 3 is a longitudinal sectional view on the line 3—3 of Figure 2.

Referring more particularly to the drawing, the reference numeral 10 designates my invention in its entirety, and as shown in Figure 1, the same is associated with a conveyor 11 for depositing sand or the like onto the same. The device is mounted at an angle or inclined and at the bottom of which is positioned a receptacle 12, and arranged directly beneath the device 11 is a receptacle or hopper 13. These parts have merely been shown to illustrate the manner in which the device may be used and it will be understood that the conveyor 11 deposits the material to be sifted upon the device 10, after which the fine particles gravitate through the device into the hopper or receptacle 13, and the larger particles pass downward on the device and into the receptacle 12.

Figure 4:
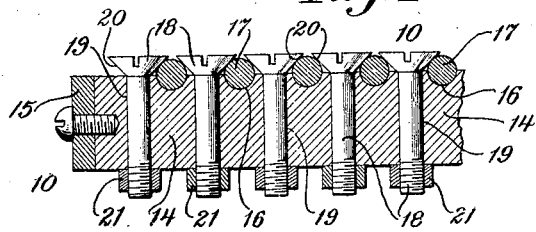
Figure 4 is a transverse sectional view on the line 4—4 of Figure 2.

The sifting device 10 comprises a plurality of spaced transverse cleats 14 having their ends secured to side rails 15 in any suitable manner so as to brace the cleats in order to withstand a relatively heavy load. Each cleat 14 is provided with a plurality of spaced grooves 16, the grooves of one cleat being in alignment with the grooves of the other cleats for receiving a plurality of longitudinal rods 17 made of a relatively strong material. The rods 17 are removably secured to the cleats by means of bolts 18, which bolts pass through openings 19 arranged between each pair of grooves, and the heads of the bolts being beveled as at 20 to rest upon the rods in a manner clearly shown in Figure 4 of the drawing. The shank of each bolt is screw threaded for the reception of a nut 21, and which nut is screwed home against the underside of the cleats and which is readily accessible when it is desired to remove any of the rods should the same become damaged. The ends of the rods are bent downward over the end cleats as at 22 to present a neat and finished device, and to prevent accidental movement of the rods in a longitudinal direction upon the loosening of the bolts.

From the foregoing description, it will be seen that there is provided a strong and durable sifting device, wherein the fine particles of material deposited thereon will pass freely at all times through the spaces defined by the rods, and the large particles will pass down the rails and off the end as clearly shown in Figure 1 of the drawing. It will be understood that the device may be manufactured in different sizes, and the spaces between the rods may be wider or narrower depending upon the materials to be sifted.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A sifting device comprising a plurality of spaced transverse members, rails secured to the ends of said transverse members for holding the same in longitudinal alignment, said transverse members having semicircular grooves formed in the upper surface thereof and openings between the grooves, rods for reception in the aligned grooves of said transverse members, bolts passing through said openings and having beveled heads for co-action with said rods, certain of said beveled heads co-acting with the rods on opposite sides of the respective openings, and a nut associated with the free end of each of said bolts for holding said heads in engagement with said rods.

2. A sifting device comprising a plurality of spaced transverse members, rails secured to the ends of said transverse members for holding the same in longitudinal alignment, said transverse members having semicircular grooves formed in the upper surface thereof and openings between the grooves, rods for reception in the aligned grooves of said transverse members, bolts passing through said openings and having beveled heads for co-action with said rods, certain of said beveled heads co-acting with the rods on opposite sides of the respective openings, and a nut associated with the free end of each of said bolts for holding said heads in engagement with said rods, the ends of said rods being bent over the end transverse members for preventing longitudinal movement of said rods upon the accidental loosening of said bolts.

In testimony whereof I have affixed my signature.

OLAF C. HOFF.